Feb. 5, 1957  H. S. HULL  2,780,469
COLLETS AND CHUCK JAW ASSEMBLAGES
Filed Jan. 6, 1955
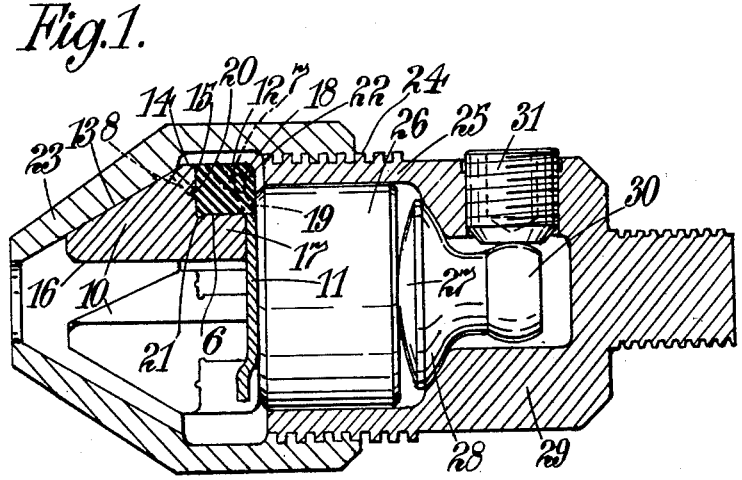
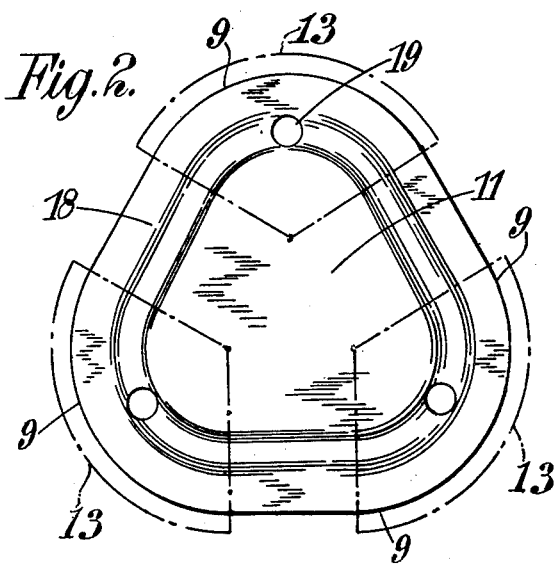
Inventor
Harold Samuel Hull United States Patent Office 2,780,469
Patented Feb. 5, 1957

2,780,469

COLLETS AND CHUCK JAW ASSEMBLAGES

Harold Samuel Hull, London, England, assignor to Dacre Chucks Limited, Chesterfield, England, a British company Application January 6, 1955, Serial No. 480,156

Claims priority, application Great Britain June 29, 1954

13 Claims. (Cl. 279—48)

This invention relates to collets and chuck jaw assemblages (hereinafter referred to as chuck jaw assemblages) of the kind in which a number of jaws are connected to a back plate by a non metallic resilient material such as rubber or rubber like material (hereinafter referred to as rubber) which is bonded to the jaws and back plate the assemblage being such as to permit movement of the jaws towards and away from the axis of rotation of the chuck. Examples of such chuck are set out in specifications Nos. 626,342 and 637,478. One of the problems in the design of such chucks is to obtain sufficient area for the bonding and an object of this invention is to overcome that difficulty.

According to this invention a collet or chuck jaw assemblage of the kind referred to above is characterised in that said rubber is arranged to extend between the base of each jaw and the front face of the back plate and also to extend around the peripheral edge of the plate to the back face thereof and is bonded at all these locations.

In one construction according to this invention the base of each jaw has a cut-away portion remote from the gripping edge of the jaw so as to provide an edge extending transversely to the gripping edge and a small rubber block is located in each cut-away portion and is bonded to said transversely extending edge and to the front face of the back plate and has a portion extending around the periphery of the plate to the back face thereof and is bonded at both these locations. It will be appreciated that in such an arrangement ample bonding area is provided for the jaws.

The bases of the jaws are arranged to abut directly against the back plate.

The peripheral portion of the plate is so shaped as to project a short distance into the cut-away portions of the jaws and the outer edges of the jaws at those ends nearest the plate are arranged to project beyond the periphery of the plate.

The peripheral portion of the back plate on the opposite side to the jaws is recessed so that rubber extends around the peripheral edge of the back plate into the recess and lies flush or below the rear face of the plate.

The aforesaid back plate may be provided with one or more slots or holes opposite the cut-away portion of each jaw through which said rubber may extend from the front face to the rear face thereof.

In one construction according to the invention said back plate is shaped by a pressing operation so that the peripheral portion is offset from the centre portion so as to provide a peripheral flange the faces of which are parallel with the faces of the centre portion.

Alternatively the peripheral flange may be inclined in relation to the centre portion so as to extend into the cut-away portion of the jaws.

The aforesaid holes through which the rubber extends from the front to the back face of the plate are formed in oblique portions of the plate at the junction between the peripheral flange and the centre part.

As is known the outer edge of each jaw beyond the cut-away portion is inclined towards the axis of the chuck as it extends away from the base of the jaw and is arranged to merge with the aforesaid transverse edge of the cut-away portion in a rounded curve along which curve the rubber is bonded thus increasing the area of bond.

The aforesaid transverse edge of each jaw may be provided with one or more recesses into which the rubber extends thereby further increasing the area of the bond. Alternatively or additionally one or more holes may be arranged to extend from the inclined outer edge of each jaw to said transverse edge of the cut-away portion into which hole or holes extend the rubber, thereby increasing the keying action of the bond.

A recess may be formed in each jaw at the junction of the transverse edge of the cut-away portion and the other edge of that portion, thus again increasing the area of the bond.

In the case where an assemblage comprises three jaws, the back plate may be of triangular configuration with rounded corners and the aforesaid holes between the centre part of the plate and the peripheral flange are disposed at the corners.

The following is a description of one form of chuck jaw assemblage according to the invention, reference being made to the accompanying drawings in which:

Figure 1 is a section through a chuck and jaw assemblage in a plane containing the axis of rotation of the chuck, and Figure 2 is a face view of the back plate of the jaw assemblage.

The jaw assemblage comprises three jaws 10 secured to a back plate 11 each by a rubber block 12. As is usual each jaw is provided with a gripping edge 16 parallel to the axis of rotation and an inclined outer edge 13. A cut-away portion is formed in each jaw in which the rubber block is located and the inclined edge 13 joins the cut-away portion in a rounded curve 14. The cut-away portion provides an edge 15 extending transversely to the gripping edge 16 and another edge 6 parallel with the gripping edge. The heel 17 of each jaw may be arranged to abut against the centre portion of the back plate 11.

The back plate is shaped by a pressing operation so that the peripheral portion 18 is offset out of the plane of the centre portion so as to provide a peripheral flange the faces of which are parallel with the faces of the centre portion and so as to form a circumferential recess on the rear face of the back plate. As will be seen from Figure 2 a back plate is approximately triangular in configuration with rounded corners 9 and the centre portion 11 is similarly shaped. It will be noted that a peripheral portion of the back plate projects a short distance into the cut-away portion of the jaws and that the outer and inclined edges 13 of the jaws at those ends nearest the face are arranged to project beyond the periphery of the plate. Instead of the peripheral portion 18 of the plate being arranged parallel with the centre portion 11 it may be inclined as indicated by the chain line 7.

Holes 19 are formed in the oblique portion of the back plate joining the centre portion 11 with the peripheral portion 18, each hole being arranged opposite a cut-away portion of a jaw.

The transverse edge 15 of each jaw may be provided with one or more recesses 20 and another recess 21 may be formed at the junction between the two edges of each cutaway portion. A small passage 8 may be arranged to extend from the inclined edge 13 of each jaw to meet the transverse edge 15 into which the rubber may also flow.

The jaws and back plate are assembled in the required relationship in a mould into which a rubber mixture is injected so as to fill the cut-away portion of the jaws and to flow around the peripheral edge of the back plate into a recess formed at the back of the peripheral flange at the locality indicated by 22 so that this part of the rubber is either flush with or slightly inset from a back face of the centre portion 11. The rounded portion 14 joining each inclined edge 13 with the transverse edge 15, the recesses 20 and 21, the surfaces of the holes 8 and 19, and of the edge of the plate and the peripheral surface of the flange provide a larger area of bond between the rubber and the metal parts.

In Figure 1 the jaw assemblage is shown mounted in a chuck comprising a sleeve having a conical portion 23 which engages the inclined edges 13 of the jaw and an internally threaded portion 24 which engages an externally threaded hollow portion 25 of the chuck body. Mounted in the hollow portion of the chuck body is a thrust pad 26 which is arranged to engage the centre portion 11 of the back plate. The thrust pad is engaged by a cam member 27 having a conical portion 28 mounted in the socket portion 29 of the chuck body. The cam member is provided with a stem portion 30 which is engageable by a laterally extending screw threaded operating screw 31 which is engageable by a suitable key.

I claim:

1. A chuck jaw assemblage comprising a back plate and a number of jaws connected to the back plate by rubber bonded to those parts, which rubber extends between the base of each jaw and the front face of the back plate and also extends in an axial direction around the peripheral edge of the back plate to the rear face thereof and is bonded at all these locations.

2. A chuck jaw assemblage comprising a back plate and a number of jaws arranged on the front face of the back plate, the base of each of which jaws has a cut-away portion remote from a gripping edge of the jaw so as to provide an edge extending transversely to the gripping edge, a small rubber block located in each cut-away portion and bonded to said transversely extending edge and to the front face of the back plate and having a portion extending in an axial direction around the periphery of the back plate to the rear face thereof and is bonded at all those locations.

3. A chuck jaw assemblage according to claim 2 wherein the peripheral portion of the plate is shaped to project a short distance into the cut-away portion of the jaws and the outer edges of the jaws at those ends nearest to the plate are arranged to project beyond the periphery of the plate.

4. A chuck jaw assemblage according to claim 2 wherein the rear of the back plate is recessed around a peripheral portion thereof so that the rubber extends around the edge of the back into a recess and lies substantially flush with the centre portion of the plate.

5. A chuck jaw assemblage according to claim 2 wherein at least one hole is formed in the back plate opposite the cut-away portion of each jaw through which hole said rubber may extend in an axial direction from the front face to the rear face of the plate.

6. A chuck jaw assemblage according to claim 2 wherein the back plate is shaped to provide a peripheral portion which is offset from the centre portion and so as to provide a peripheral flange the faces of which are parallel with the faces of the centre portion.

7. A chuck jaw assemblage according to claim 2 wherein the back plate is shaped to provide a peripheral portion inclined in relation to the centre portion and so as to extend into the cut-away portion of the jaws.

8. A chuck jaw assemblage according to claim 2 wherein the back plate is shaped to provide a peripheral portion offset and joined to the centre portion by an oblique portion and so as to provide a peripheral flange which projects into the cut-away portions of the jaws and wherein holes are formed in the oblique portion through which the rubber extends in a direction inclined to the axis of rotation from the front to the back face of the plate.

9. A chuck jaw assemblage according to claim 2 wherein the outer edge of each jaw beyond the cut-away portion is inclined towards the axis of the chuck as it extends away from the base of the jaw and is arranged to merge with the aforesaid transverse edge of the cut-away portion in a rounded curve along which curve the rubber is bonded.

10. A chuck jaw assemblage according to claim 2 wherein the transverse edge of each jaw is provided with at least one recess into which the rubber extends.

11. A chuck jaw assemblage according to claim 2 wherein at least one hole is arranged to extend from the inclined outer edge of each jaw to the transverse edge of the cut-away portion into which hole the rubber extends.

12. A chuck jaw assemblage according to claim 2 wherein a recess is formed in each jaw at the junction of the transverse edge of the cut-away portion and the other edge of that portion.

13. A chuck jaw assemblage according to claim 2 and having three jaws wherein the back plate is of triangular configuration with rounded corners and the peripheral portion is offset from the centre portion so as to be joined thereto by an oblique portion which oblique portion and centre portion are also triangular in configuration with rounded corners and wherein holes are formed in the oblique portion at the rounded corners.

References Cited in the file of this patent

UNITED STATES PATENTS 2,535,105    Vidal  ---------------- Dec. 26, 1950